US012780245B2

(12) United States Patent
Ohsugi

(10) Patent No.: US 12,780,245 B2
(45) Date of Patent: Nov. 3, 2026

(54) METHOD AND DEVICE FOR MANAGING VEHICLE DATA

(71) Applicant: TOYOTA JIDOSHA KABUSHIKI KAISHA, Toyota (JP)

(72) Inventor: Masamichi Ohsugi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 47 days.

(21) Appl. No.: 18/667,545

(22) Filed: May 17, 2024

(65) Prior Publication Data

US 2024/0391492 A1 Nov. 28, 2024

(30) Foreign Application Priority Data

May 23, 2023 (JP) ................................ 2023-084500

(51) Int. Cl.

*B60W 40/09* (2012.01)
*B60W 50/00* (2006.01)
*B60W 60/00* (2020.01)

(52) U.S. Cl.

CPC .......... *B60W 60/001* (2020.02); *B60W 40/09* (2013.01); *B60W 50/00* (2013.01); *B60W 60/0053* (2020.02); *B60W 60/0057* (2020.02); *B60W 2050/0031* (2013.01); *B60W 2556/20* (2020.02); *B60W 2556/45* (2020.02)

(58) Field of Classification Search

None

See application file for complete search history.

(56) References Cited

U.S. PATENT DOCUMENTS

| | | | | |
|---|---|---|---|---|
| 2015/0199617 A1 | 7/2015 | Kuwajima | | |
| 2019/0283774 A1 | 9/2019 | Ishisaka et al. | | |
| 2023/0084316 A1* | 3/2023 | Levandowski | ....... | B60W 30/12 701/28 |
| 2023/0315085 A1* | 10/2023 | Lee | ....................... | B60W 30/10 701/2 |
| 2024/0123975 A1* | 4/2024 | Sridharan | ............. | B60W 30/09 |

FOREIGN PATENT DOCUMENTS

| | | | | |
|---|---|---|---|---|
| CA | 3067576 A1 * | 7/2020 | | |
| CA | 3112095 A1 * | 9/2021 | .......... | B60W 60/001 |
| DE | 102022211224 A1 * | 10/2023 | ............ | B60W 30/10 |
| JP | 2015-135552 A | 7/2015 | | |

(Continued)

*Primary Examiner* — Shelley Chen

(74) *Attorney, Agent, or Firm* — Dinsmore & Shohl LLP

(57) ABSTRACT

A management server transmits data for updating indicating data to update a trained model to at least two vehicles on which autonomous driving control by using the trained model is performed. The trained model indicates a model generated by a machine learning. The management server collects data for verification from each of the at least two vehicles to which the data for updating have been transmitted. The data for verification indicates data obtained or generated in connection with the performance with the autonomous driving control by using an updated trained model indicating the trained model updated by the data for updating. The management server verifies the function of the autonomous driving control in which the updated trained model is used, by using the data for verification that have been collected from the at least two vehicles.

6 Claims, 7 Drawing Sheets

(56) References Cited

FOREIGN PATENT DOCUMENTS

| | | | |
|---|---|---|---|
| JP | 2018-195184 | A | 12/2018 |
| JP | 2019-156171 | A | 9/2019 |
| JP | 2021-532487 | A | 11/2021 |
| JP | 2022-002118 | A | 1/2022 |
| WO | 2020/026318 | A1 | 2/2020 |

* cited by examiner

INS_LOG

| GROUP ID | EVENT ID | EVENT NAME EN | PRIORITY PL | EVENT DETERMINATION On/Off |
|---|---|---|---|---|
| GI1 | EI1 | EN1 | 4 | On |
| | EI2 | EN2 | 3 | On |
| | EI3 | EN3 | 4 | On |
| | EI4 | EN4 | 3 | On |
| | EI5 | EN5 | 3 | On |
| GI2 | EI6 | EN6 | 3 | On |
| | EI7 | EN7 | 2 | Off |
| | EI8 | EN8 | 1 | Off |
| ⋮ | ⋮ | ⋮ | ⋮ | ⋮ |
| GIm | EIn | ENn | 5 | Off |

*FIG. 4*

METHOD AND DEVICE FOR MANAGING VEHICLE DATA

CROSS-REFERENCE TO RELATED APPLICATION

The present application claims priority under 35 U.S.C. § 119 to Japanese Patent Application No. 2023-084500, filed on May 23, 2023, the contents of which application are incorporated herein by reference in their entirety.

TECHNICAL FIELD

The present disclosure relates to a method and a system for managing autonomous driving functions in vehicles.

BACKGROUND

JP2015135552A discloses a system for updating parameters of image recognition processing performed in each of a plurality of vehicles. This related art includes a server that communicates with the plurality of vehicles. This server collects image data captured by multiple vehicles as learning data and performs machine learning processing using this learning data. This machine learning processing generates data to update parameters of the image recognition processing. This server also provides data generated by the machine learning processing to the plurality of vehicles from which the learning data is collected. Each of the plurality of vehicles updates the parameters of the image recognition processing by using the data provided by the server.

Examples of documents showing the technical level of the technical field relating to the present disclosure include JP2022002118A, JP2021532487A, JP2018195184A and JP2019156171A in addition to JP2015135552A.

The image recognition processing performed in a vehicle is useful for autonomous driving control of this vehicle. In addition to the image recognition processing, examples of processing useful for the autonomous driving control include processing for a "path planning" of the vehicle and a "driving planning" of the vehicle. In recent years, models generated through a machine learning (hereinafter also referred to as "trained models") are sometimes used for such the processing.

Consider a case where the trained model and model building elements such as parameters of the trained model are updated. In this case, it is desirable to verify whether the processing using the updated trained model is being performed appropriately in the autonomous driving control. For example, it is desirable to perform this validation immediately after updating the trained model. Alternatively, it is desirable to perform this periodically after updating the trained model.

However, related arts such as JP2015135552A do not focus on the verification of the trained model. Therefore, it can be said that there is room for a development of a technology that can verify whether computer processing using the updated trained model is being performed appropriately in the autonomous driving control.

An object of the present disclosure is to provide a technique that makes it possible to verify when a model generated by a machine learning is updated in a vehicle on which autonomous driving control is performed.

SUMMARY

A first aspect of the present disclosure is a method of managing autonomous driving function in a vehicle, and has the following features.

The method includes the steps of:

a management server transmitting data for updating indicating data to update a trained model to at least two vehicles on which autonomous driving control are performed by using the trained model, the trained model indicating a model generated by a machine learning;

the management server collecting data for verification from each of the at least two vehicles to which the data for updating have been transmitted, the data for verification indicating data obtained or generated in connection with the performance with the autonomous driving control by using an updated trained model indicating the trained model updated by the data for updating; and the management server verifying the function of the autonomous driving control in which the updated trained model is used, by using the data for verification that have been collected from the at least two vehicles.

A second aspect of the present disclosure is a system that manages autonomous driving function in vehicles, and has the following features.

The system includes a management server configured to manage the autonomous driving function.

The management server is configured to:

perform processing to transmit data for updating indicating data to update a trained model to at least two vehicles on which autonomous driving control are performed by using the trained model, the trained model indicating a model generated by a machine learning;

perform processing to collect data for verification from each of the at least two vehicles to which the data for updating have been transmitted, the data for verification indicating data obtained or generated in connection with the performance with the autonomous driving control by using an updated trained model indicating the trained model updated by the data for updating; and processing to verify the function of the autonomous driving control in which the updated trained model is used, by using the data for verification that have been collected from the at least two vehicles.

According to the present disclosure, the data for verification is collected from each of the at least two vehicles to which the data for updating have been transmitted. Additionally, the function of the autonomous driving control is verified by using this data for verification. Therefore, it is possible to determine whether the updated trained model is in accordance with an intention of the update. Therefore, for example, if it is found that the updated trained model is not in accordance with the intention, measures can be taken such as generating data to correct the updated trained model or model building elements and updating the updated trained model again. In this way, according to present disclosure, it is possible to confirm that the autonomous driving function using the updated trained model is in accordance with the intention of the update. This contributes to improving a reliability of the autonomous driving function using the trained model.

BRIEF DESCRIPTION OF THE DRAWINGS

FIG. 4 is a diagram showing an example of instruction data regarding log data management;

DESCRIPTION OF EMBODIMENT

An embodiment of present disclosure will be explained below with reference to the drawings. In each figure, the same or corresponding parts are given the same sign and the explanation thereof will be simplified or omitted.

1. Outline of Embodiment

Figure 1:
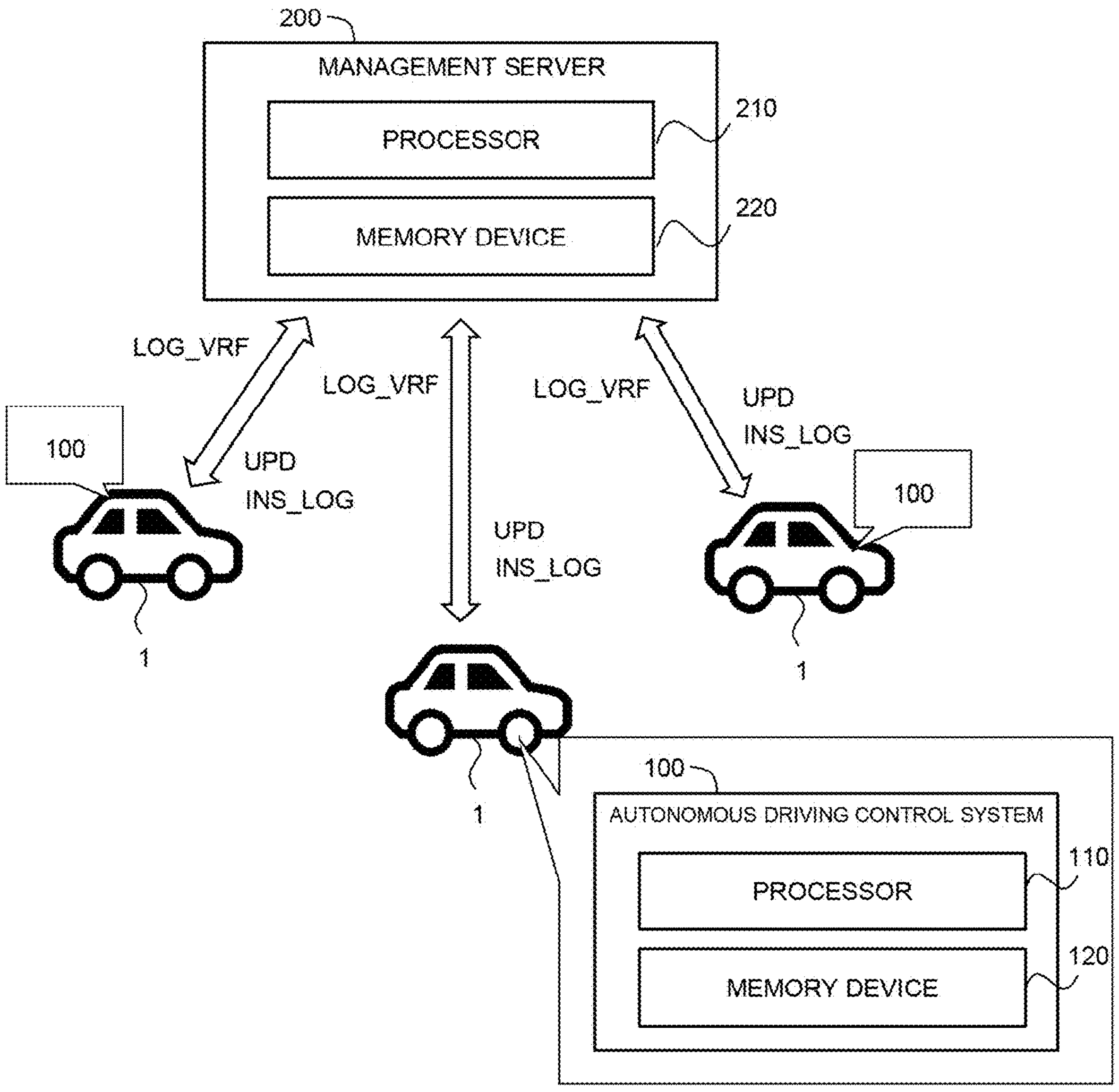
FIG. 1 is a diagram for illustrating an outline of an embodiment.

FIG. 1 is a diagram for illustrating an outline of this embodiment. FIG. 1 depicts three vehicles 1 and a management server 200. The three vehicles 1 are an example of "at least two vehicles" in the present disclosure. Each of the vehicles 1 (hereinafter also referred to as a "management object 1") includes an autonomous driving system 100 for autonomous driving control of the management object 1. The autonomous driving refers to automatically performing at least one of a steering, an acceleration, and a deceleration of a vehicle without any driving operation by an operator. The autonomous driving control is a concept that includes not only fully autonomous driving control but also risk avoidance control, lane keep assist control, etc. The operator may be a driver who rides the management object 1, or may be a remote operator who remotely controls the management object 1.

The autonomous driving system 100 includes one or more processors 110 (hereinafter simply referred to as a "processor" 110) and one or more memory devices 120 (hereinafter simply referred to as a "memory device 120"). The processor 110 executes various processes. Examples of the processor 110 include a CPU (Central Processing Unit), a GPU (Graphics Processing Unit), an ASIC (Application Specific Integrated Circuit), and an FPGA (Field-Programmable Gate Array). The memory device 120 stores various information. Examples of the memory device 120 include an HDD (Hard Disk Drive), an SSD (Solid State Drive), volatile memory, and nonvolatile memory.

The management server 200 constitutes a management system of this embodiment together with the autonomous driving system 100. The management server 200 manages function of the autonomous driving system 100, that is, the autonomous driving function. The management server 200 includes one or more processors 210 (hereinafter simply referred to as a "processor 210") and one or more memory devices 220 (hereinafter simply referred to as a "memory device 220"). The processor 210 performs various processing. An example of the processor 210 is the same as that of the processor 110 described above. The memory device 220 stores various information. An example of the memory device 220 is the same as that of the memory device 120 described above.

The management server 200 communicates with each of the autonomous driving systems 100. In communicating with the autonomous driving system 100, the management server 200 transmits data for updating UPD and instruction data INS_LOG to each of the autonomous driving systems 100. The data for updating UPD is data for updating a trained model. The data for updating UPD includes model building elements such as the trained model itself and parameters of the trained model. The trained model is included in the function of an autonomous driving control portion of the autonomous driving system 100. The function of this autonomous driving control portion will be described later. The instruction data INS_LOG is data that includes an instruction regarding a management of log data LOG in the autonomous driving system 100. The instruction data INS_LOG will also be described later.

When the trained model is updated in the autonomous driving system 100, it is desirable to verify whether processing using the updated trained model is being performed appropriately in the autonomous driving control. Therefore, in this embodiment, the management server 200 collects data for verification LOG_VRF from each of the autonomous driving systems 100. Furthermore, the management server 200 performs a verification based on the collected data for verification LOG_VRF. The data for verification LOG_VRF is log data LOG obtained or generated in the processing using the updated trained model and the processing related to the autonomous driving control.

By performing verification using the data for verification LOG_VRF, it is possible to determine whether the updated trained model is in accordance with an intention of the update. Therefore, if it turns out that the updated trained model is not in accordance with the intention, it is possible to take measures such as generating data to correct the updated trained model and the model building elements and updating the updated trained model again. In this way, according to this embodiment, it is possible to confirm that the autonomous driving function using the updated trained model is in accordance with the intention of the update. This contributes to improving a reliability of the autonomous driving function using the trained model.

2. Configuration Example of Management System

2-1. Configuration Example of Autonomous Driving System

Figure 2:
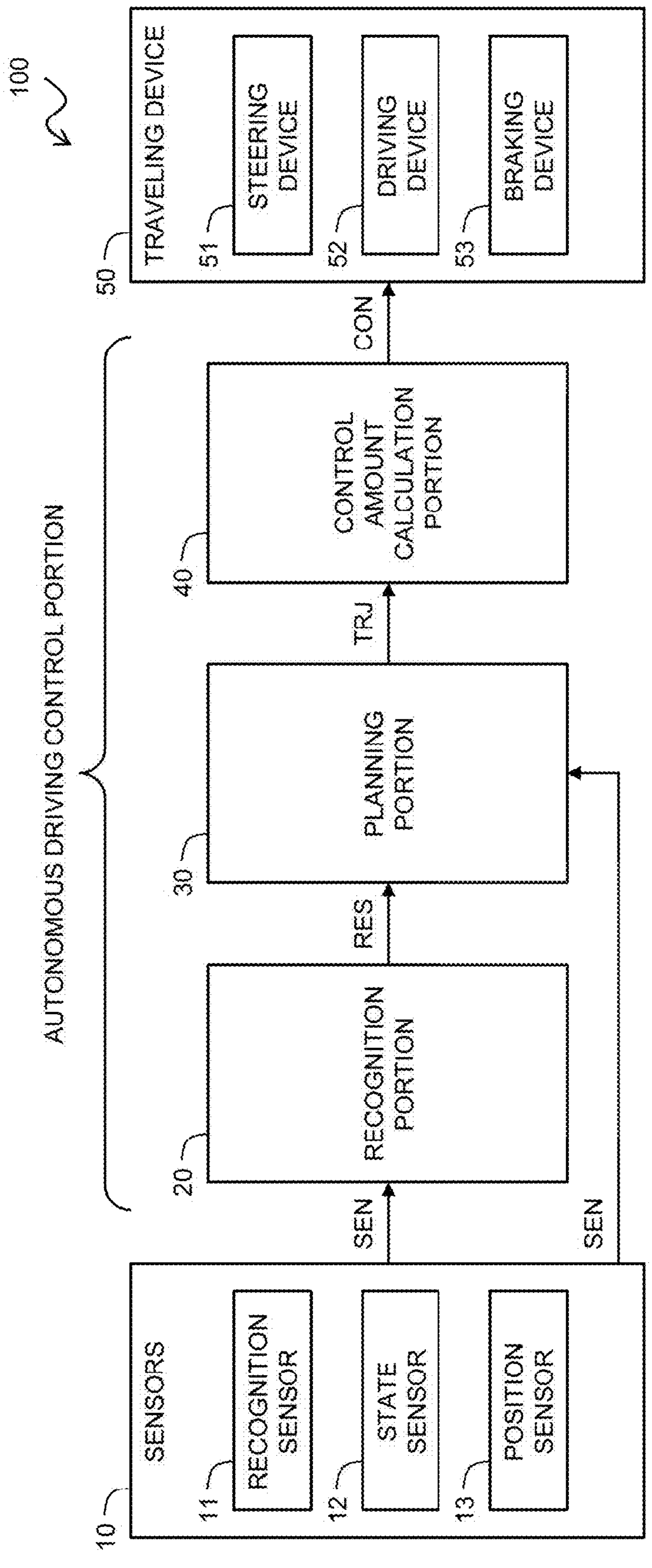
FIG. 2 is a block diagram showing a configuration example of an autonomous driving system installed in a vehicle.

The present embodiment will be explained in more detail below. FIG. 2 is a block diagram showing a configuration example of the autonomous driving system 100 installed in each of the vehicles 1 shown in FIG. 1. In the example shown in FIG. 2, the autonomous driving system 100 includes sensors 10, a recognition portion 20, a planning portion 30, a control amount calculation portion 40, and a driving device 50.

The sensors 10 include a recognition sensor 11 used to recognize a surrounding situation of the management object 1. Examples of the recognition sensor 11 include a camera, an LIDAR (Laser Imaging Detection and Ranging), a radar, and the like. The sensors 10 may further include a state sensor 12 that detects a state of the management object 1, a position sensor 13 that detects a position of the management object 1, and the like. Examples of the state sensor 12 include a speed sensor, an acceleration sensor, a yaw rate sensor, and a steering angle sensor. As the position sensor 13, an GNSS (Global Navigation Satellite System) sensor is exemplified.

Information on sensor detection SEN is information obtained by the sensors 10. For example, the information on sensor detection SEN includes an image taken by the camera. As another example, the information on sensor detection SEN may include point cloud information obtained by the LIDAR. The information on sensor detection SEN may include vehicle status information indicating the status of the management object 1. The information on sensor detection SEN may include positional information indicating the position of the management object 1.

The recognition portion 20 receives the information on sensor detection SEN. The recognition portion 20 recognizes the surrounding situation of the management object 1 based on the information obtained by the recognition sensor 11. For example, the recognition portion 20 recognizes an object around the management object 1. Examples of the object include a walker, other vehicles (e.g., a preceding vehicle, a parking vehicle, etc.), a white lane, a road construction (e.g., a guard rail, a curb), a fallen object, a traffic light, an intersection, a mark, and the like. Information on recognition result RES indicates a recognition result by the recognition portion 20. For example, the information on recognition result RES includes object information indicating a relative position and relative speed of the object with respect to the management object 1.

The planning portion (a planner) 30 receives the information on recognition result RES from the recognition portion 20. The planning portion 30 may also receive the vehicle status information, the positional information, and map information generated in advance. The map information may be high-precision three-dimensional map information. The planning portion 30 generates a driving plan for the management object 1 based on the received information. The driving plan may be for reaching a preset destination or for avoiding risks. Examples of the driving plan include maintaining current traveling lane, changing lanes, an overtaking, a turning left and right, a steering, an accelerating, a decelerating, and a stopping. Furthermore, the planning portion 30 generates a target trajectory TRJ necessary for the management object 1 to travel according to the driving plan. The target trajectory TRJ includes target positions and target speed.

The control amount calculation portion 40 receives the target trajectory TRJ from the planning portion 30. The control amount calculation portion 40 calculates the control amount CON necessary for the management object 1 to follow the target trajectory TRJ. The control amount CON can also be said to be the control amount required to reduce the deviation between the management object 1 and the target trajectory TRJ. The control amount CON includes at least one of a steering control amount, a drive control amount, and a braking control amount. Examples of the steering control amount include a target steering angle, target torque, target motor angle, and target motor drive current. Examples of the drive control amount include target speed, target acceleration, and the like. Examples of the braking control amount include target speed, target deceleration, and the like.

The driving device 50 includes a steering device 51, a driving device 52, and a braking device 53. The steering device 51 steers the wheels. For example, the steering device 51 includes an electric power steering (EPS) device. The driving device 52 is a power source that generates driving force. Examples of the driving device 52 include an engine, an electric motor, an in-wheel motor, and the like. The braking device 53 generates braking force. The driving device 50 receives the control amount CON from the control amount calculation portion 40. The driving device 50 operates the steering device 51, the driving device 52, and the braking device 53 according to the steering control amount, drive control amount, and braking control amount, respectively. As a result, the management object 1 travels to follow the target trajectory TRJ.

The recognition portion 20 includes at least one of rule-based models and trained models. The rule-based models perform recognition processing based on a predetermined set of rules. Examples of the trained model include NN (Neural Network), SVM (Support Vector Machine), regression model, decision tree model, and the like. The NN may be an CNN (Convolutional Neural Network), an RNN (Recurrent Neural Network), or a combination thereof. Type of each layer, number of the layers, and number of nodes in the NN are arbitrary. The trained model is one that has been previously generated or updated through machine learning. The recognition portion 20 performs the recognition processing by inputting the information on sensor detection SEN to the model. The information on recognition result RES is output from the model or generated based on the output from the model.

Similarly, the planning portion 30 includes at least one of rule-based models and trained models. The planning portion 30 performs planning processing by inputting the information on recognition result RES into the model. The target trajectory TRJ is output from the model or generated based on the output from the model.

Similarly, the control amount calculation portion 40 includes at least one of rule-based models and trained models. The control amount calculation portion 40 performs control amount calculation processing by inputting the target trajectory TRJ into the model. The control amount CON is output from the model or generated based on the output from the model.

Two or more of the recognition portion 20, the planning portion 30 and the control amount calculation portion 40 may be integrally configured. The recognition portion 20, the planning portion 30, and the control amount calculation portion 40 may all be configured integrally (an End-to-End configuration). For example, the recognition portion 20 and the planning portion 30 may be integrally configured by the NN that outputs the target trajectory TRJ from the information on sensor detection SEN. Even in the case of the integrated configuration, intermediate products such as the information on recognition result RES and the target trajectory TRJ may be output. For example, when the recognition portion 20 and the planning portion 30 are integrally configured by the NN, the information on recognition result RES may be an output of the middle layer of the NN.

The recognition portion 20, the planning portion 30, and the control amount calculation portion 40 constitute an "autonomous driving control portion" that controls the autonomous driving of the management object 1. In this embodiment, the trained model is used for at least part of the autonomous driving control portion. That is, at least one of the recognition portion 20, the planning portion 30, and the control amount calculation portion 40 includes the trained model. The autonomous driving control portion performs at least part of the autonomous driving control of the management object 1 using the trained model.

2-2. Configuration Example of Management Server

Figure 3:
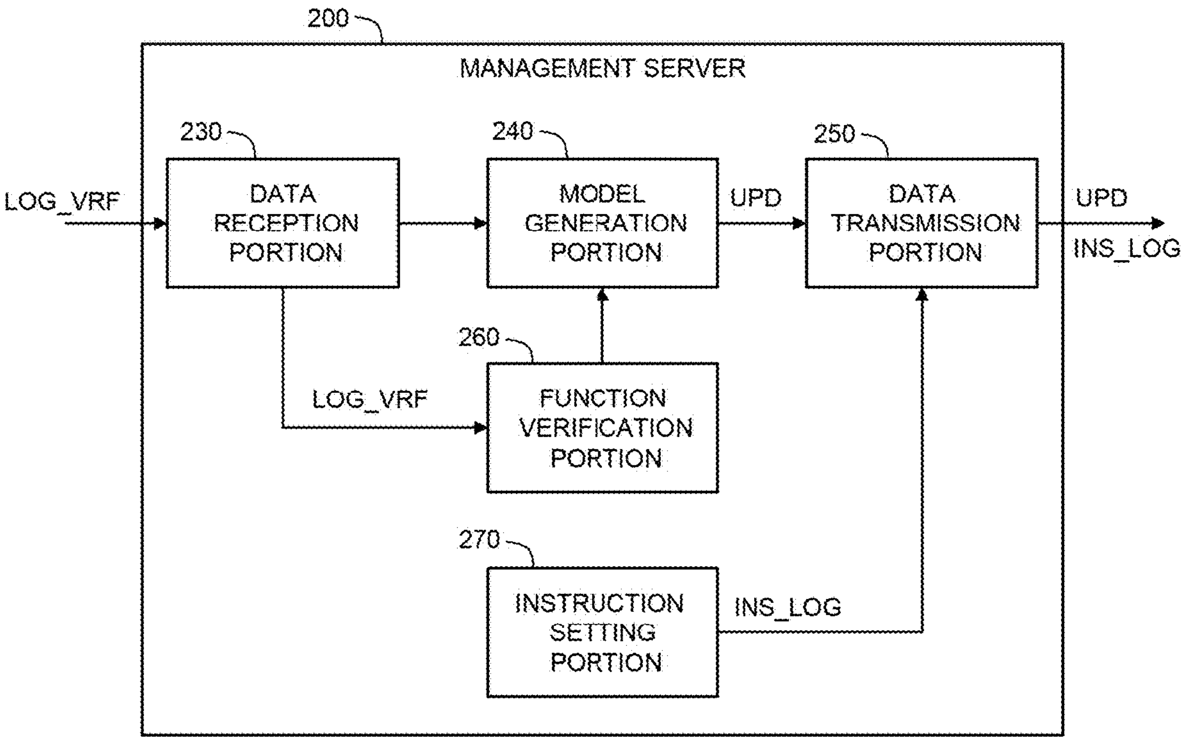
FIG. 3 is a block diagram showing an example function configuration of a management server.

FIG. 3 is a block diagram showing an example function configuration of the management server 200 shown in FIG. 1. In the example shown in FIG. 3, the management server 200 includes a data reception portion 230, a model generation portion 240, a data transmission portion 250, a function verification portion 260, and an instruction setting portion 270. The functions of the model generation portion 240, the function verification portion 260, etc. are realized, for example, by the processor 210 shown in FIG. 1 executing a predetermined program stored in the memory device 220.

The data reception portion 230 has a function as an interface that receives various data from outside the management server 200. The various data received by the data reception portion 230 includes the data for verification LOG_VRF. Examples of the data for verification LOG_VRF include the information on sensor detection SEN, the control amount CON, the information on recognition result RES, and the target trajectory TRJ shown in FIG. 2. The data for verification LOG_VRF may include a reason for the determination in the recognition processing by the recognition portion 20 shown in FIG. 2. The data for verification LOG_VRF may include the reason for the determination in the planning processing by the planning portion 30 shown in FIG. 2. The data for verification LOG_VRF may include a presence or absence of an operator intervention for the autonomous driving control.

The model generation portion 240 generates the data to update the trained model applied to the autonomous driving system 100 (i.e., the data for updating UPD). The data for updating UPD includes model building elements such as the trained model itself and the parameters of the trained model. Examples of the machine learning models for updating include the same machine learning models that have already been applied to the autonomous driving system 100. When the trained model is generated, the trained model applied to the autonomous driving system 100 is updated by being replaced with this generated trained model. When the model building elements are generated, the trained model applied to the autonomous driving system 100 is updated by modifying the model building elements.

The data transmission portion 250 has a function as an interface that transmits various data from the management server 200 to the outside. The various data transmitted by the data transmission portion 250 includes the data for updating UPD received from the model generation portion 240. The data for updating UPD includes the trained model and the model building elements generated by the model generation portion 240. The various data transmitted by the data transmission portion 250 also includes the instruction data INS_LOG received from the instruction setting portion 270.

The function verification portion 260 uses the data for verification LOG_VRF to verify whether processing using the updated trained model and processing related to the autonomous driving control are being performed appropriately. As already explained, in this embodiment, the trained model is used for at least part of the autonomous driving control portion explained in FIG. 2. Therefore, the autonomous driving function using the updated trained model is subject to verification by the function verification portion 260.

The verification of the autonomous driving function is performed after a predetermined period (e.g., one week, one month) has elapsed after transmitting the data for updating UPD. Alternatively, the autonomous driving function is verified after a driving distance of the management object 1 reaches a predetermined distance (e.g., 5 to 10 km) after transmitting the data for updating UPD. The verification of the autonomous driving function uses a preset verification index. Examples of the verification index includes number of the interventions made by the operator to the autonomous driving control.

As described above, the data for verification LOG_VRF may include the data on the operator intervention for the autonomous driving control. If there are many interventions to the autonomous driving control during the predetermined period (or while driving the predetermined distance), there is a possibility that the operator has a feeling of a strangeness about the autonomous driving function using the updated trained model. For example, if the number of the interventions after this update has significantly increased compared to that after the previous update, it is expected that the operator may have a strong feeling of the strangeness about the trained model after this update.

The example of the verification index described above is an example when focusing on one management object 1 (or one operator). When focusing on two or more management objects 1 (two or more operators), the number of the interventions per management object (i.e., an average number of times) can be used as the verification index. However, a frequency of the interventions for the autonomous driving control may vary depending on the driving proficiency of the operator. Therefore, when focusing on two or more management objects 1, it is desirable to calculate the verification index by weighting according to a driving proficiency. For example, assuming that the higher the skill level of manual driving, the higher the frequency of the intervention, an example can be considered in which the weight coefficient of the operator with low skill level is increased. Alternatively, assuming that the higher the skill level of the autonomous driving, the lower the frequency of the intervention, an example can be considered in which the weight coefficient of the highly skilled operator is reduced.

The instruction setting portion 270 sets the instruction data INS_LOG. In the instruction data INS_LOG, among the events related to the behavior of the management object 1, predetermined event PEs and the like that are subject to the collection of the data for verification LOG_VRF are specified. The instruction data INS_LOG is provided from the management server 200 to the management object 1 at a predetermined timing during the day (e.g., at the ignition of the management object 1 is turned on). Original data of the instruction data INS_LOG is stored in the memory device 220. The content of this original data is updated by the management server 200.

FIG. 4 is a diagram showing an example of instruction data INS_LOG. In the example shown in FIG. 4, the instruction data INS_LOG includes the following items: group ID, event id, event name EN, priority PL, and event determination ON/Off. Note that the instruction data INS_LOG may include items other than these items. Examples of the other items include a pattern for obtaining the data for verification LOG_VRF, location conditions (latitude and longitude), time conditions (morning, afternoon, late night), and weather conditions (sunny, cloudy, rainy) for obtaining the data for verification LOG_VRF. The location, time, and weather conditions can be set to intensively collect the data for verification LOG_VRF.

The group ID is an item that identifies a group to which the predetermined event PE belongs. In the example shown in FIG. 4, GI1, GI2, and GIm (m is a natural number of 3 or more) are set as the group ID. The GI1 is, for example, the ID of a group related to behavior control of the vehicle 1. The GI2 is, for example, the ID of a group related to external recognition by the management object 1. The GIm is, for example, the ID of a group related to an occurrence of an abnormality in various systems installed in the management object 1.

The event id is an item that identifies the predetermined event PE. In the example shown in FIG. 4, EI1 to E15 are set as the event id of the GI1. The EI1 is, for example, the ID indicating a detection of a sudden acceleration or a rapid deceleration of the management object 1. The EI2 is, for example, the ID indicating a detection of an operation transition demand (TD) by the operator of the management object 1. The EI3 is, for example, the ID indicating a detection of a sharp turn of the management object 1. The EI4 is, for example, the ID indicating a detection of the behavior of the management object 1 that is different from those of surrounding vehicles. The EI5 is, for example, the ID indicating a detection of a short inter-vehicular distance between a preceding vehicle or a following vehicle.

In the example shown in FIG. 4, EI6 to EI8 are also set as the event id of the GI2. The EI6 is, for example, the ID indicating a misidentification. The EI7 is, for example, the ID indicating a detection of clouds. The EI8 is, for example, the ID indicating a detection of raindrops. An EIn is set in the event id of the GIm (n is a natural number of 3 or more). The EIn is, for example, the ID indicating a detection of an error signal.

The event name EN is an item that clearly indicates contents of the predetermined event PE. In the example shown in FIG. 4, EN1 to ENn are set as the event names EN. The EN1 to ENn correspond to the EI1 to EIn, respectively.

The priority PL is an item indicating a priority of the collection of the data for verification LOG_VRF to the memory device 120 when a predetermined event PE occurs. The priority PL is also an item indicating a priority order for transmitting the data for verification LOG_VRF to the management server 200. In the example shown in FIG. 4, the priority PL is divided into five levels from 1 to 5. The larger the priority PL number, the higher the priority is given to the collection of the data for verification LOG_VRF in the predetermined event PE. Furthermore, the larger the priority PL number, the higher the priority is given to the transmission of data for verification LOG_VRF.

The event determination ON/Off is an item indicating whether the predetermined event PE is treated as an "event to be collected CTE". The event to be collected CTE is an event in which the log data LOG during the predetermined event PE is collected in the memory device 21 as the data for verification LOG_VRF. The predetermined event PE of which the event determination is "On" is treated as the event to be collected CTE. The predetermined event PE of which the event determination is "Off" is not treated as the event to be collected CTE. That is, the log data LOG during the predetermined event PE with the event determination "On" is collected in the memory device 21 as the data for verification LOG_VRF, whereas the log data LOG during the predetermined event PE with the event determination "Off" is not collected in the memory device 21.

Here, the log data LOG during the predetermined event PE will be explained with reference to FIG. 5. In the example shown in FIG. 5, the predetermined event PE with the event id=EI3 occurs at time t1. Further, at time t2, the predetermined event PE with the event id=EI1 occurs. Note that the predetermined event PEs with event id=EI1 and event id=EI3 both correspond to the predetermined event PEs (i.e., the events to be collected CTE) of which the event determination is "On" (see FIG. 4).

When the predetermined event PE that occurs at a certain time corresponds to the event to be collected CTE, log data in a predetermined collection time CT is extracted from the log data LOG of this event to be collected CTE. The extracted log data LOG is stored in the memory device 120. This log data LOG corresponds to the data for verification LOG_VRF. In the upper part of FIG. 5, the log data LOG including the information on sensor detection SEN, the control amount CON, the information on recognition result RES, and the target trajectory TRJ is depicted.

The collection time CT at which the log data LOG is extracted and stored is set based on the time when it is determined that the event to be collected CTE has occurred. In the example shown in FIG. 5, it is determined that two types of events to be collected CTE have occurred at times t1 and T2. A collection time CT1 for the first event to be collected CTE (event id=EI3) includes a time zone Z1 before time t1 and a time zone Z2 after time t1. Furthermore, a collection time CT2 for the second event to be collected CTE (event id=EI1) includes a time zone Z3 before time t2 and a time zone ZA after time t2.

A length of each of the time zones Z1, Z2, Z3, and ZA is, for example, 1 to 10 seconds. However, it may take time to determine whether the predetermined event PE corresponds to the event to be collected CTE. Therefore, the time at which it is determined that the event to be collected CTE has occurred is assumed to be slightly later than the time at which the event to be collected CTE occurs. Therefore, it is desirable that the lengths of time zones Z1, Z2, Z3, and Z4 (i.e., the lengths of collection times CT1 and CT2) be set for each or the event to be collected CTE content (or the event id).

Figure 5:
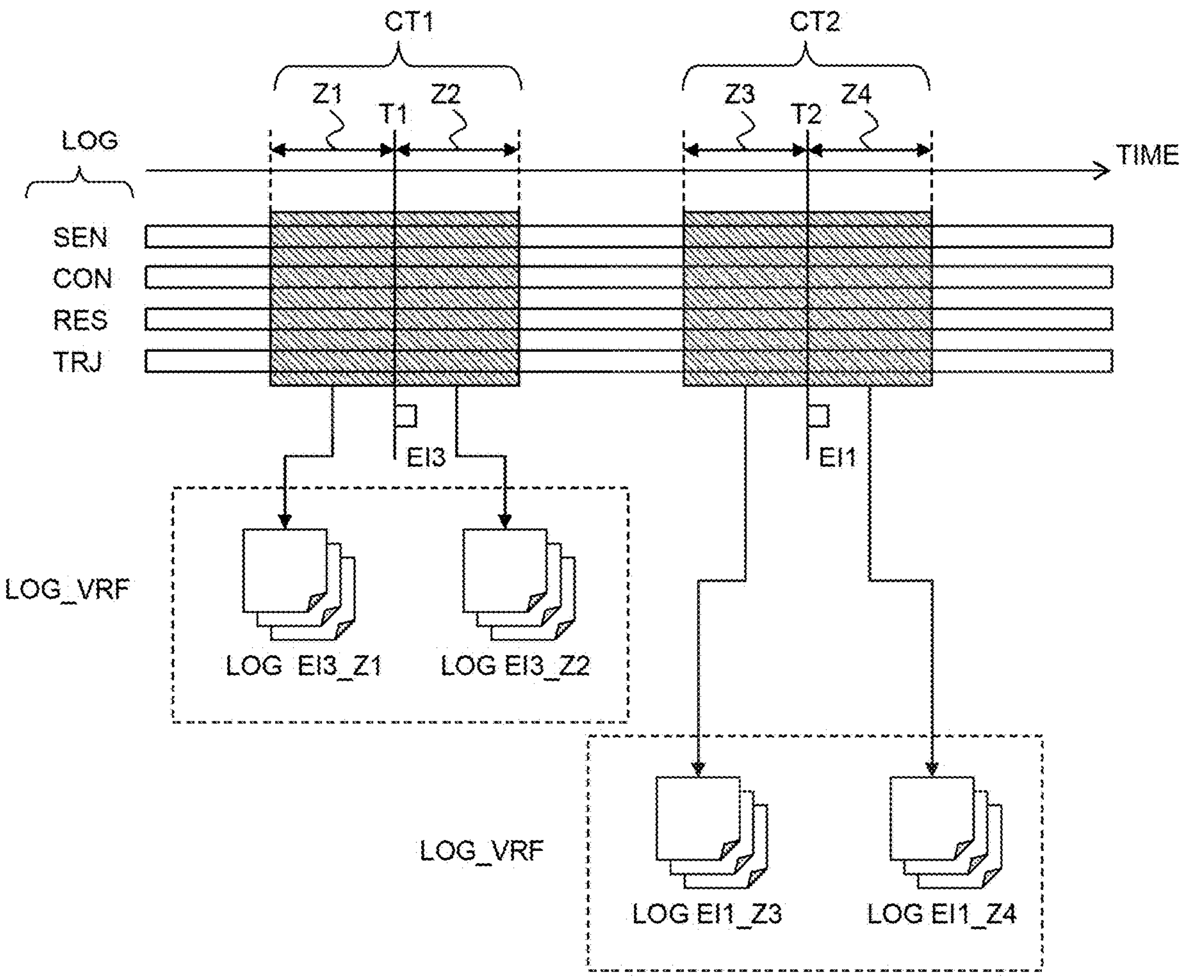
FIG. 5 is a diagram for illustrating a collection time at which log data is extracted and stored.

Furthermore, in the case of the operator intervention event for the autonomous driving control, such as an operation transition demand caused by the operator, it is expected that the operator will remember the feeling of strangeness before a reference time (e.g., the time t1 or T2 in FIG. 5). In addition, the frequency of the intervention for the autonomous driving control may vary depending on the driving proficiency of the operator. Therefore, in the case of the operator intervention event for the autonomous driving control, it is desirable that the collection time CT be set according to the driving proficiency. For example, a case is expected where the time zone (time zone Z1 or Z3 in FIG. 5) that is earlier than the reference time (time t1 or T2 in FIG. 5) is set to short, assuming that the higher the skill level of manual driving, the shorter the time it takes to decide on the intervention. Another case is expected where the time zone before the reference time is set long, assuming that the higher the level of the autonomous driving skill, the longer it takes to decide on the intervention.

3. Processing Example Performed by Processor

3-1. Processing Example in Autonomous Driving System 100

Figure 6:
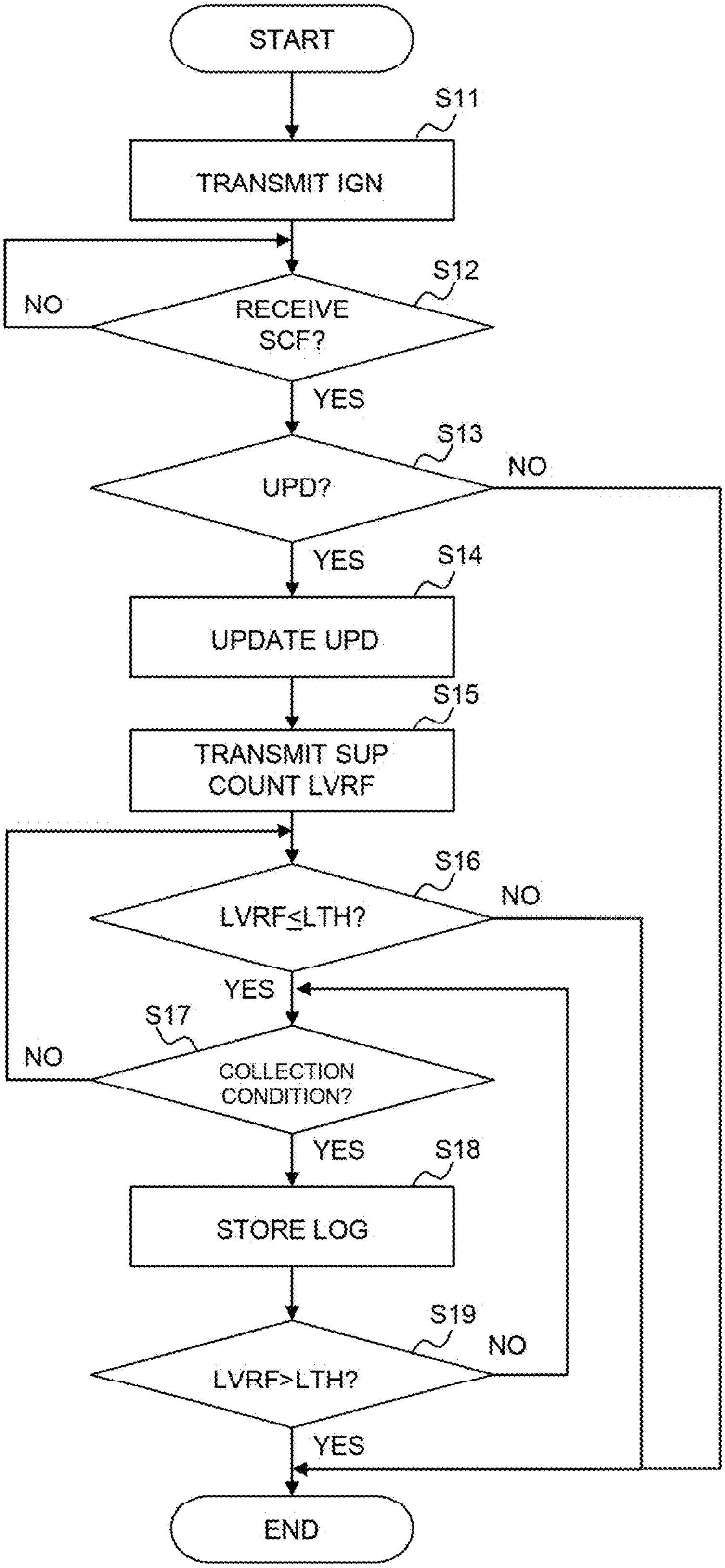
FIG. 6 is a flowchart showing a flow of processing by the autonomous driving system, particularly related to the embodiment.

FIG. 6 is a flowchart showing a flow of processing by processor 110 that is particularly relevant to this embodiment. The routine shown in FIG. 6 is executed, for example, immediately after the autonomous driving system 100 is activated.

In the routine shown in FIG. 6, first, data at startup IGN is sent to the management server 200 (step S11). The data at startup IGN is data for notifying the management server 200 that the ignition of the management object 1 has been turned on. The data at startup IGN includes, for example, identification data of the management object 1, version data of the autonomous driving system 100, and the like. The version data also includes version data of the trained model applied to the autonomous driving system 100. The data at startup IGN may include the data for verification LOG_VRF that has not been transmitted to the management server 200.

Following the processing in step S11, it is determined whether a confirmation signal SCF has been received (step S12). The confirmation signal SCF is a signal that notifies the management object 1 that the management server 200 has acknowledged the data at startup IGN. The processing in step S12 is repeated until a positive determination result is obtained.

If the determination result in step S12 is positive, it is determined whether the data for updating UPD is transmitted (step S13). When the trained model applied to the autonomous driving system 100 is updated, a signal notifying that data for updating UPD has been transmitted is added to the confirmation signal SCF received in the processing in step S12. Therefore, when this additional signal is recognized, it is determined that there is the data for updating UPD.

If the determination result in step S13 is positive, data for updating UPD is updated (step S14). In addition, when the processing in step S14 is performed, it is desirable to notify the operator through a user interface some autonomous driving control of the management object 1 may not be performed until the data for updating UPD is completed.

Following the processing in step S14, a completion signal SUP is transmitted to the management server 200, and counting of a verification distance LVRF is started (step S15). The completion signal SUP is a signal that notifies the management server 200 that updating of the data for updating UPD has been completed. That is, the completion signal SUP is generated and transmitted to the management server 200 when the update of data for updating UPD is completed in the management object 1. The verification distance LVRF is set to collect the data for verification LOG_VRF.

Following the processing in step S15, it is determined whether the verification distance LVRF is equal to or less than a threshold LTH (step S16). The threshold LTH corresponds to the above-mentioned "predetermined driving distance (e.g., 5 to 10 km) of the management object 1 after transmitting the data for updating UPD". If the determination result in step S16 is negative, that is, if the verification distance LVRF exceeds the threshold LTH, the collection of the data for updating UPD ends.

If the determination result in step S16 is positive, it is determined whether a collection condition is satisfied (step S17). Whether or not the collection condition is satisfied can be determined based on whether the event to be collected CTE have occurred. As already explained, the event to be collected CTE is an event in which the log data LOG of the predetermined event PE is stored in the memory device 21. Therefore, if it is determined that a predetermined event PE has occurred, the instruction data INS_LOG explained in FIG. 4 is referred to. This makes it possible to determine whether the event to be collected CTE have occurred.

If the determination result in step S17 is negative, the processing returns to step S16. On the other hand, if the determination result in step S17 is positive, the log data LOG is stored in the memory device 120 (step S18). In the processing in step S18, first, data for the predetermined period is extracted from the log data LOG of the event to be collected CTE, based on the time at which it is determined that the event to be collected CTE has occurred. The concept of this predetermined period is as explained in FIG. 5. Then, the extracted log data LOG is stored in the memory device 120. This log data LOG corresponds to the data for verification LOG_VRF described above. The data for verification LOG_VRF stored in the memory device 120 is sent to the management server 200 as appropriate.

Following the processing in step S18, it is determined whether the verification distance LVRF exceeds threshold LTH (step S19). The determination content in step S19 is opposite to that in step S16. If the determination result in step S19 is negative, that is, if the verification distance LVRF is less than or equal to the threshold LTH, processing from step S17 is performed. If the determination result in step S19 is positive, the data for updating UPD collection ends. In this way, when there is an update to the data for updating UPD, the processing from steps S16 to S19 is repeated to collect the data for updating UPD.

3-2. Processing Example Performed by Management Server 200

Figure 7:
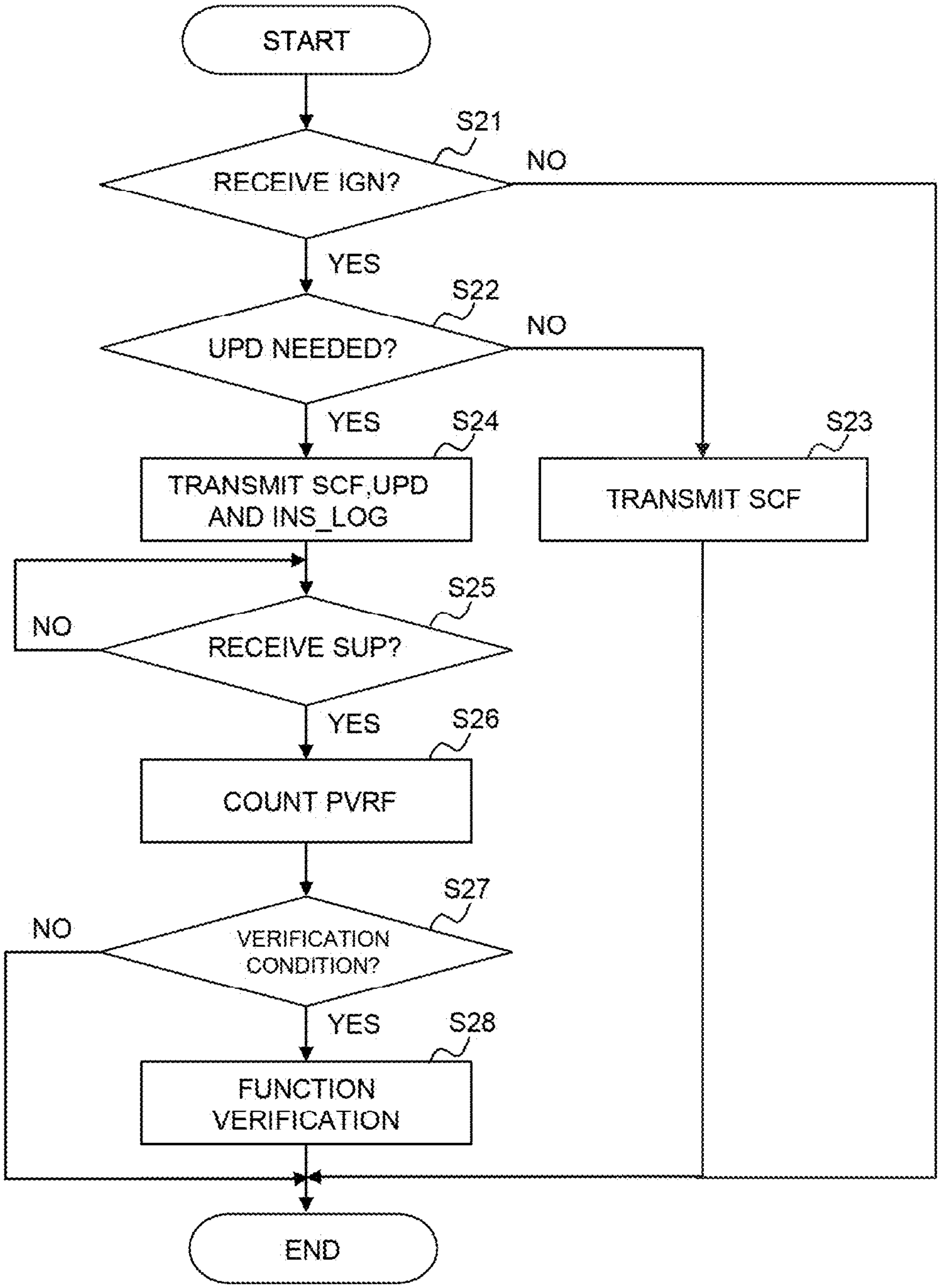
FIG. 7 is a flowchart showing a flow of processing by the management server, specifically related to the embodiment.

FIG. 7 is a flowchart showing a flow of processing by processor 210 that is particularly relevant to this embodiment. The routine shown in FIG. 7 is repeatedly executed in a predetermined control cycle.

In the routine shown in FIG. 7, first, it is determined whether the data at startup IGN has been received from the management object 1 (step S21). The data at startup IGN has already been described. If the data at startup IGN includes data for verification LOG_VRF, the data for verification LOG_VRF is stored in the memory device 220 as appropriate.

Following the processing in step S21, it is determined whether it is necessary to transmit the data for updating UPD (step S22). In the processing in step S22, it is determined whether the version of the trained model needs to be upgraded, for example, based on the data at startup IGN (the version data of the trained model) received in the processing in step S21.

If the determination result in step S22 is negative, the confirmation signal SCF is transmitted to the management object 1 (step S23). The confirmation signal SCF has already been explained. On the other hand, if the determination result in step S22 is positive, in addition to the confirmation signal SCF, the data for updating UPD and the instruction data INS_LOG are transmitted to the management object 1 (step S24). The instruction data INS_LOG has already been explained.

Following the processing in step S24, it is determined whether the completion signal SUP has been received from the management object 1 (step S25). The completion signal SUP has already been explained. The processing step S25 is repeated until a positive determination result is obtained.

If the determination result in step S25 is positive, counting of a verification period PVRF is started (step S26). The verification period PVRF is set to collect the data for verification LOG_VRF.

Following the processing in step S26, it is determined whether a verification condition is satisfied (step S27). The verification condition includes, for example, the following conditions.

(i) The verification period PVRF is greater than or equal to a threshold PTH (ii) A significant number of the data for verification LOG_VRF has been obtained (iii) At least two management objects 1 have completed running the verification distance LVRF Note that the threshold PTH corresponds to the above-mentioned the "predetermined period (e.g., one week, one month) after transmitting the data for updating UPD."

For example, if the conditions (i) and (ii) are satisfied, it is determined that the verification condition is satisfied. In another example, if the conditions (i), (ii) and (iii) are all satisfied, it is determined that the verification condition is satisfied. If the determination result in step S27 is positive, the autonomous driving function is verified (step S28). The verification of the autonomous driving function is performed using the preset verification index. The example of the verification and the example of the verification index have already been explained.

What is claimed is:

1. A method for managing autonomous driving function in a vehicle, the method comprising the steps of:

a management server transmitting data for updating indicating data to update a trained model to at least two vehicles on which autonomous driving control are performed by using the trained model, the trained model indicating a model generated by a machine learning;

the management server collecting data for verification from each of the at least two vehicles to which the data for updating have been transmitted, the data for verification indicating data comprising data captured by one or more sensors, a target trajectory, a control amount to follow the target trajectory, and a recognition result of the one or more sensors obtained or generated in connection with the performance with the autonomous driving control by using an updated trained model indicating the trained model updated by the data for updating;

the management server verifying the function of the autonomous driving control in which the updated trained model is used, by using the data for verification that have been collected from the at least two vehicles;

a processor configured to perform the autonomous driving control of a management object included in the at least two vehicles collecting data obtained or generated in connection with the performance of the autonomous driving control in the management object as the data for verification regarding the management object during the autonomous driving control using the updated trained model, the data for verification collected during a predetermined collection time starting from a reference timing at which a predetermined collection condition is satisfied; and the processor transmitting the data for verification regarding the management object to the management server;

wherein the predetermined collection condition includes a condition that there has been an intervention to the autonomous driving control by an operator of the management object, and wherein the method further comprises the step of variably setting a length of the predetermined collection time based on a timing at which the collection condition is satisfied, and based on a driving proficiency of the operator of the management object.

2. The method according to claim 1, wherein the collection condition includes a condition that that a driving environment condition of the management object matches a preset condition.

3. A system for managing autonomous driving function in a vehicle, comprising a management server configured to manage the autonomous driving function and a processor, wherein the management server is configured to:

perform processing to transmit data for updating indicating data to update a trained model to at least two vehicles on which autonomous driving control are performed by using the trained model, the trained model indicating a model generated by a machine learning;

perform processing to collect data for verification from each of the at least two vehicles to which the data for updating have been transmitted, the data for verification indicating data comprising data captured by one or more sensors, a target trajectory, a control amount to follow the target trajectory, and a recognition result of the one or more sensors obtained or generated in connection with the performance with the autonomous driving control by using an updated trained model indicating the trained model updated by the data for updating; and processing to verify the function of the autonomous driving control in which the updated trained model is used, by using the data for verification that have been collected from the at least two vehicles; and wherein the processor is configured to:

perform the autonomous driving control of a management object included in the at least two vehicles;

during the autonomous driving control using the updated trained model, collect data obtained or generated in connection with the performance of the autonomous driving control in the management object as the data for verification regarding the management object, the data for verification collected during a predetermined collection time starting from a reference timing at which a predetermined collection condition is satisfied; and transmit the data for verification regarding the management object to the management server;

wherein the predetermined collection condition includes a condition that there has been an intervention to the autonomous driving control by an operator of the management object, and wherein the method further comprises the step of variably setting a length of the predetermined collection time based on a timing at which the collection condition is satisfied, and based on a driving proficiency of the operator of the management object.

4. A method for managing autonomous driving function in a vehicle, the method comprising the steps of:

a management server transmitting data for updating indicating data to update a trained model to at least two vehicles on which autonomous driving control are performed by using the trained model, the trained model indicating a model generated by a machine learning;

the management server collecting data for verification from each of the at least two vehicles to which the data for updating have been transmitted, the data for verification indicating data comprising data captured by one or more sensors, a target trajectory, a control amount to follow the target trajectory, and a recognition result of the one or more sensors obtained or generated in connection with the performance with the autonomous driving control by using an updated trained model indicating the trained model updated by the data for updating;

the management server verifying the function of the autonomous driving control in which the updated trained model is used, by using the data for verification that have been collected from the at least two vehicles;

a processor configured to perform the autonomous driving control of a management object included in the at least two vehicles collecting data obtained or generated in connection with the performance of the autonomous driving control in the management object as the data for verification regarding the management object during the autonomous driving control using the updated trained model, the data for verification collected during a predetermined collection time starting from a reference timing at which a predetermined collection condition is satisfied; and the processor transmitting the data for verification regarding the management object to the management server;

wherein the predetermined collection condition includes a condition that there has been an intervention to the autonomous driving control by an operator of the management object;

wherein, in the step of verifying the autonomous driving function, number of interventions for the autonomous driving control is used as a verification index, the interventions obtained during a predetermined verification period after transmitting the data for updating or until a driving distance of the management object reaches a predetermined verification distance after transmitting the data for updating; and wherein, when the interventions to the autonomous driving control by the operator of the management object occur in at least two of the management objects, the number of the interventions as the verification index is calculated by weighting according to a driving proficiency of the operators of the at least two management objects in the step of verifying the autonomous driving function.

5. The system according to claim 3, wherein the collection condition includes a condition that that a driving environment condition of the management object matches a preset condition.

6. The method according to claim 4, wherein the collection condition includes a condition that that a driving environment condition of the management object matches a preset condition.

* * * * *